Figure 1:
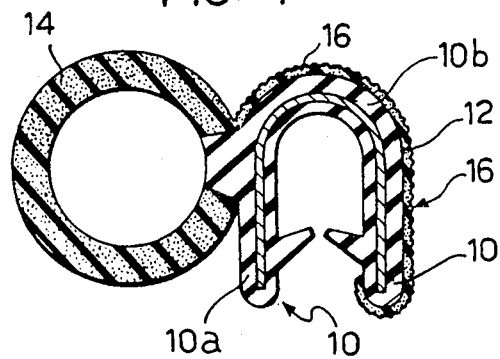

United States Patent

Azzola

[11] 4,411,941
[45] Oct. 25, 1983

[54] SEALING STRIP FOR VEHICLE BODIES

[75] Inventor: Roberto Azzola, Turin, Italy

[73] Assignee: Saiag S.p.A. Industria Articoli Gomma, Cirie', Italy

[21] Appl. No.: 419,276

[22] Filed: Sep. 17, 1982

Related U.S. Application Data

[62] Division of Ser. No. 193,212, Oct. 1, 1980, Pat. No. 4,381,273.

[30] Foreign Application Priority Data

Dec. 21, 1979 [IT] Italy .............................. 69460 A/79

[51] Int. Cl.³ .............................................. E06B 7/16
[52] U.S. Cl. .................................... 428/122; 49/490;
 49/498; 52/716; 428/358
[58] Field of Search ................. 428/31, 122, 188, 358;
 52/716; 49/489, 490, 498; 156/154; 264/45.9,
 46.1, 162, 171, 173

[56] References Cited

U.S. PATENT DOCUMENTS

| 2,794,757 | 6/1957 | Bright | 428/122 |
| 3,129,448 | 4/1964 | Mittman | 15/1.5 R |
| 3,385,001 | 5/1968 | Bordner | 49/498 X |
| 3,638,359 | 2/1972 | Kruschwitz | 428/122 X |
| 3,706,628 | 12/1972 | Azzola | 428/122 X |
| 4,348,443 | 9/1982 | Hein | 428/122 |
| 4,374,880 | 2/1983 | Mesnel | 428/122 X |
| 4,381,273 | 4/1983 | Azzola | 264/45.9 |

Primary Examiner—Henry F. Epstein
Attorney, Agent, or Firm—Sughrue, Mion, Zinn, Macpeak and Seas

[57] ABSTRACT

The sealing strip includes a channel-shaped attachment profile of rubber, in which a metallic reinforcing strip is embedded; this profile has an external coating layer of sponge rubber with an outer surface rendered velvety by abrasion.

4 Claims, 2 Drawing Figures

SEALING STRIP FOR VEHICLE BODIES

This is a division of application Ser. No. 193,212, filed Oct. 1, 1980, now U.S. Pat. No. 4,381,273.

The present invention relates to an extruded sealing strip for vehicle bodies, including a channel-shaped attachment profile of solid rubber in which a metallic reinforcing strip is embedded.

Very often such sealing strips also have a sealing bead of sponge rubber, co-extruded with the attachment profile and having a cross-sectional shape suitable for the use for which it is intended, for example, a more or less circular, tubular form, or a lip-forming section, said sealing bead being carried by one branch of the channel-section of the attachment profile.

It is known to coat the attachment profile externally, particularly on the dorsal surface and on the branch opposite to that carrying the sealing bead, with a textile fabric, typically a velvet or similar fabric with a short pile. This involves substantial difficulties in the production process and complications in the production line. Moreover, since the velvet ribbon is united to the attachment profile before the latter is bent transversely into its channel-shape, the subsequent bending introduces stresses between the profile and the velvet layer which, on the one hand, tend to open apart the branches of the channel and thus weaken the hold of the attachment profile on the respective member of the bodywork, and on the other hand often result in local detachment of the coating. Yet again, even the curving of the sealing strip during the application to the bodywork is difficult because of the substantial inextensibility of the velvet ribbon.

The sealing strip according to the invention is characterised essentially in that the coating layer consists of sponge rubber with an outer surface rendered velvety by abrasion. Preferably the "sponge rubber" is an expanded rubber with a fine cellular structure, with closed cells of a diameter generally not greater than 1–2 tenths of a millimeter, substantially of the same type typically used for the sealing bead. According to one embodiment of the invention, when the sealing strip includes a sealing bead as specified above, the coating layer and the sealing bead may be formed of the same material, usually colored black. According to another embodiment, the coating layer and the sealing bead may have different colors. In each case, the abraded surface of the coating layer gives the latter the appearance of velvet. Moreover, the coating layer is elastically extensible with little effort, whereby it does not oppose perceptibly either the bending of the attachment profile into the channel-shape, or the curving of the latter to the contour it must follow in its mounted position in a vehicle body.

The process according to the invention is characterised substantially in that the coating layer is added to the attachment profile by means of co-extrusion and subsequent vulcanization of the two. After the vulcanization, the removal of the "skin" of the coating layer is carried out by means of abrasion, in known manner, usually with the use of one or more grinding wheels, so as to expose the cellular structure of the layer and form the desired "pile" on the latter.

When the sealing bead and the coating layer are of the same material, the bead and the layer may be co-extruded from a single feed flow to the extrusion nozzle. In this case two extruders only are sufficient: one, the main one, which feeds the nozzle with a blend for the formation of the attachment profile completely enveloping the sheet-metal reinforcing strip, and the other which feeds the nozzle with a flow of expansible blend which is distributed, in the nozzle itself, to the nozzle aperture for the formation of the sealing bead and the aperture for the formation of the coating layer.

However, usually, the materials of the sealing bead and of the coating layer are different from each other, mainly in that the softness of the sponge rubber forming the coating layer should advantageously be less than that of the sealing bead. Moreover, it may be desirable for the coating layer to contain particular coloring substances or pigments necessary for ornamental reasons, such as, for example, powdered bronze to obtain a "lamè" appearance.

In these cases, in the process according to this invention the coating layer and the sealing bead are obtained from two distinct feed flows of the respective expansible blends to the co-extrusion nozzle. That is to say, a third extruder is necessary for a separate feed of the nozzle aperture for the formation of the coating layer.

Figure 2:
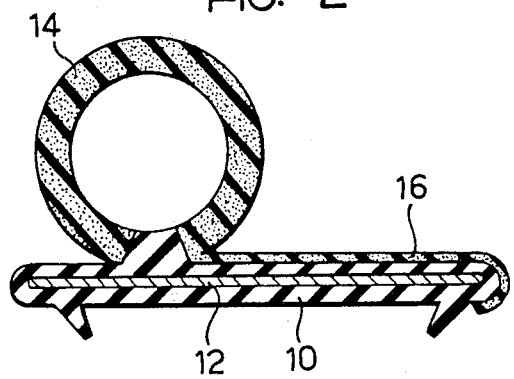

In the appended drawings:

FIG. 1 is a transverse cross-sectional view of a sealing strip according to the invention and FIG. 2 is a similar view of the same sealing strip in an intermediate stage of manufacture.

In the drawings, by 10 is indicated the channel-shaped attachment profile of solid rubber, in which a metallic reinforcing strip 12 of any suitable type, known per se, is embedded. On one branch 10a of the channel-section of the attachment profile 10 is formed, by means of co-extrusion, a tubular sealing bead 14 or sponge rubber or circular cross-section. According to the invention, the dorsal surface 10b and the other branch 10c of the attachment profile 10 are coated externally with a continuous layer 16 of sponge rubber, co-extruded with the attachment profile 10.

Typically, the thickness of the coating layer 16 is not greater than one millimeter and the outer surface 16' of the layer is abraded in the manner already indicated above, so that the surface 16' is velvety on both touch and visual appearance.

The sponge rubber of the layer 16 is preferably less soft (or more consistent) than the sponge rubber of the sealing bead 14. Moreover, the layer 16 may have a color different from that of the sealing bead (which is usually black). In both cases, correspondingly formulated, expandible rubber blends are adopted and separately fed to the co-extrusion nozzle.

FIG. 2 illustrates the form of the sealing strip immediately after co-extrusion and vulcanization. In this condition, the attachment profile 10 is still in a flat form, originating from co-extrusion, which allows the abrading (grinding) of the outer surface of the coating layer 16 to be carried out easily, whereupon only the attachment profile 10 is bent transversely to its ultimate channel-shape illustrated in FIG. 1.

I claim:

1. A sealing strip for vehicle bodies comprising a channel-shaped attachment profile of solid rubber having embedded therein a metallic reinforcing strip, wherein the attachment profile has on its exposed surface a coating layer of sponge rubber co-extruded and co-vulcanized with the profile so as to be of one piece integral construction therewith and wherein the exposed surface of the coating layer is rendered velvety by abrasion.

2. The sealing strip of claim 1, moreover comprising a sealing bead of sponge rubber co-extruded with the attachment profile and carried by one branch of the channel-section of the latter, and wherein the said coating layer of sponge rubber covers the dorsal surface and the other branch of the attachment profile.

3. The sealing strip of claim 2, wherein the sponge rubber forming the coating layer is less soft than that of the sealing bead.

4. The sealing strip of claim 2, wherein the sponge rubber forming the coating layer is colored differently than that of the sealing bead.

* * * * *